United States Patent
Lin

(10) Patent No.: US 7,061,720 B2
(45) Date of Patent: Jun. 13, 2006

(54) TURNTABLE STRUCTURE THAT CONTROLS FUNCTION SELECTION FOR A MEDIA PLAYER

(75) Inventor: Da-Yu Lin, Taipei (TW)

(73) Assignee: Inventec appliances Corporation, Taipei Hsieng (TW)

(*) Notice: Subject to any disclaimer, the term of this patent is extended or adjusted under 35 U.S.C. 154(b) by 325 days.

(21) Appl. No.: 10/620,695

(22) Filed: Jul. 17, 2003

(65) Prior Publication Data

US 2005/0015792 A1    Jan. 20, 2005

(51) Int. Cl.
*G01S 3/80* (2006.01)
*G11B 3/58* (2006.01)

(52) U.S. Cl. .................. 360/137; 720/652; 345/184
(58) Field of Classification Search ................. 345/184
See application file for complete search history.

(56) References Cited

U.S. PATENT DOCUMENTS 6,903,903 B1* 6/2005 Fruge et al. ............. 360/265.7

2002/0071206 A1* 6/2002 Choo et al. ............... 360/99.12

* cited by examiner

*Primary Examiner*—Brian E. Miller
(74) *Attorney, Agent, or Firm*—Birch, Stewart, Kolasch & Birch, LLP

(57) ABSTRACT

'A turntable structure to control function selection for a media player. The turntable structure includes a base, a retaining ring, a bearing assembly, a rotating assembly and a rotating shaft. The base has a central post. The central post has a protrusion and a positioning portion formed thereon. The retaining ring is disposed on the central post and has an engaging hole and a positioning groove. The protrusion is engaged in the engaging hole and the positioning portion is engaged with the positioning groove. A gap exists between the retaining ring and the central post to prevent deformation of the central post resulting from thermal expansion and contraction. The bearing assembly encircles the retaining ring. The rotating assembly is assembled on the bearing assembly. The rotating shaft is fit in the central post and connected to the rotating assembly.

17 Claims, 5 Drawing Sheets

TURNTABLE STRUCTURE THAT CONTROLS FUNCTION SELECTION FOR A MEDIA PLAYER

BACKGROUND OF THE INVENTION

1. Field of the Invention

The present invention relates to a turntable structure, and in particular to a turntable structure that controls function selection for a media player.

2. Description of the Related Art

Referring to FIG. 1, a media player 1 uses a conventional turntable structure 10 to control and select the function provided thereby.

Referring to FIG. 2A and FIG. 2B, the conventional turntable structure 10 is composed of a base 12, a bearing assembly 14, a rotating assembly 16 and a rotating shaft 18. The base 12 has a central post 20 formed thereon. The bearing assembly 14 is pressed on the central post 20. The rotating shaft 18 is fit into the central post 20 and connected to the rotating assembly 16. In addition, a plurality of toothed portions (not shown) are disposed on the bottom of the rotating assembly 16, and a sensor (not shown) is disposed on the media player 1. When the rotating assembly 16 rotates, the sensor detects the number of the toothed portions which have rotated to determine the rotary position of the rotating assembly 16 and outputs a corresponding signal to the media player 1.

Nevertheless, the conventional turntable structure 10 has many drawbacks. The bearing assembly 14 is directly pressed on the central post 20 formed on the base 12. When the bearing assembly 14 is pressed on the central post 20, force applied to press the bearing assembly 14 causes breakage between the base 12 and the central post 20.

In addition, because the base 12 and the central post 20 are composed of plastic and the bearing assembly 14 is composed of metal, the thermal expansion coefficient of the central post 20 is different from and greater than that of the bearing assembly 14. Additionally, there must be a tight fit between the central post 20 and the bearing assembly 14. When ambient temperature rises, severe compression occurs between the inner ring 14a of the bearing assembly 14 and the central post 20 due to thermal expansion. Thus, the central post 20 may be deformed or break. In another aspect, when the ambient temperature decreases, the bearing assembly 14 may be separated from the central post 20 because of deformation of the central post 20. Although the bearing assembly 14 may not completely separate from the central post 20, the horizontal positions of the bearing assembly 14 and the rotating assembly 16 change due to the deformation of the central post 20, such that the number of toothed portions which have rotated is inaccurately detected by the sensor.

Hence, there is a need to provide an improved turntable structure to overcome the aforementioned problems. The turntable structure includes a retaining ring. The retaining ring is disposed between the bearing assembly and the central post such that the bearing assembly snugly encircles the central post. Meanwhile, a gap exists between the retaining ring and the central post, such that undesirable effects as mentioned above are prevented when the ambient temperature changes.

SUMMARY OF THE INVENTION

Accordingly, an object of the invention is to provide a turntable structure to control function selection for a media player. The turntable structure comprises a base, a retaining ring, a bearing assembly, a rotating assembly and a rotating shaft. The base has a central post. The central post has a protrusion and a positioning portion formed thereon. The retaining ring is disposed on the central post and has an engaging hole and a positioning groove. The protrusion is engaged in the engaging hole and the positioning portion is engaged with the positioning groove. A gap exists between the retaining ring and the central post to prevent deformation of the central post resulting from thermal expansion and contraction. The bearing assembly encircles the retaining ring. The rotating assembly is assembled on the bearing assembly. The rotating shaft is fit in the central post and connected to the rotating assembly.

Preferably, the retaining ring is composed of metal.

Preferably, the central post is hollow.

Preferably, the edge of the top end of the central post is sloped.

Preferably, the portion between the central post and the base is a curved surface.

Preferably, the bearing assembly is a ball bearing assembly.

Preferably, the central post is formed integrally with the base.

Preferably, the bottom of the rotating assembly further comprises a plurality of toothed portions enabling detection of the rotary position of the rotating assembly.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

A detailed description is given in the following embodiments with reference to the accompanying drawings.

BRIEF DESCRIPTION OF THE DRAWINGS

The present invention will become more fully understood from the subsequent detailed description and the accompanying drawings, which are given by way of illustration only, and thus are not limitative of the present invention, and wherein.

DETAILED DESCRIPTION OF THE INVENTION

Figure 1:
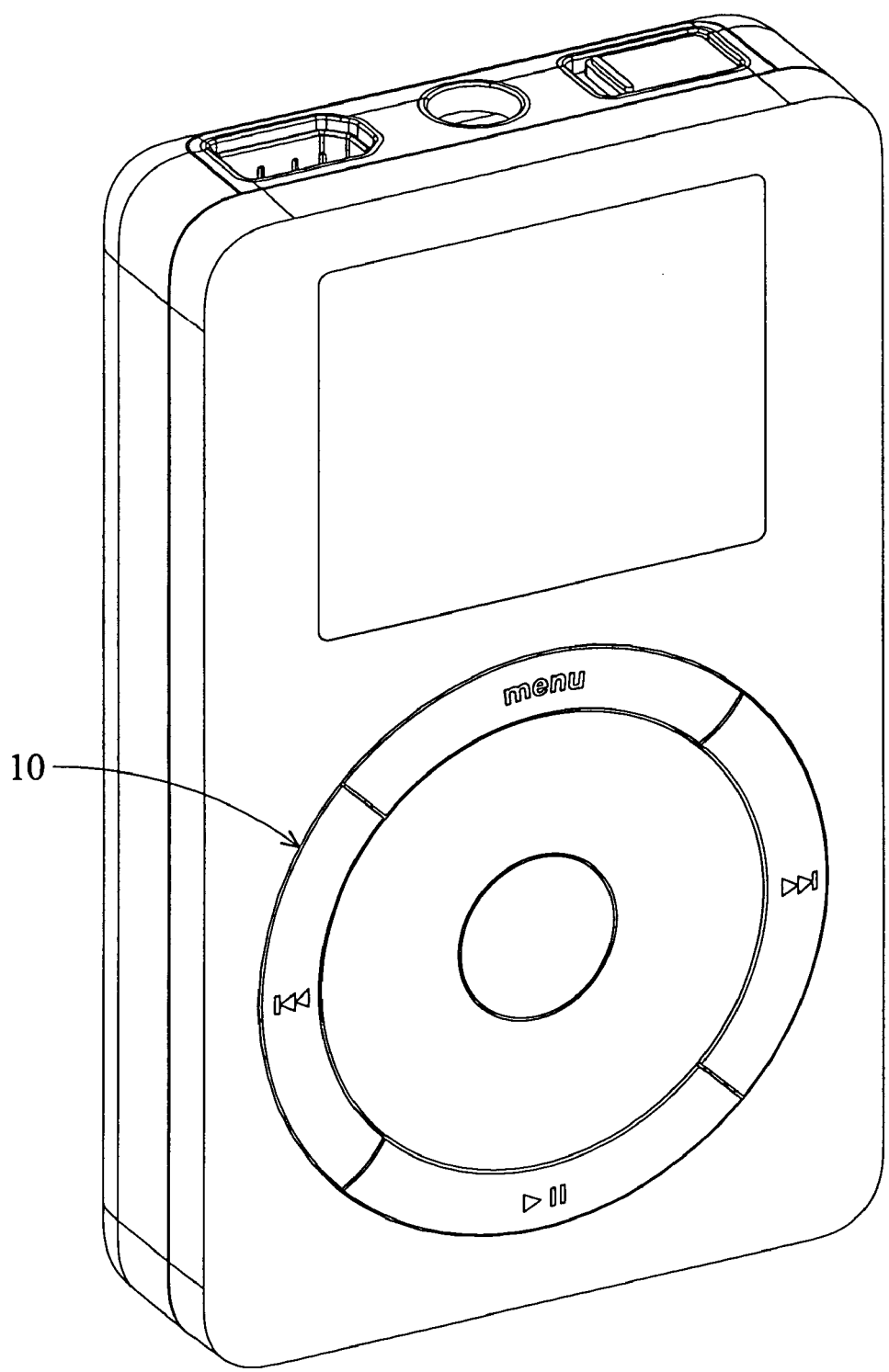
FIG. 1 is a perspective view showing a media player.
Figure 2A:
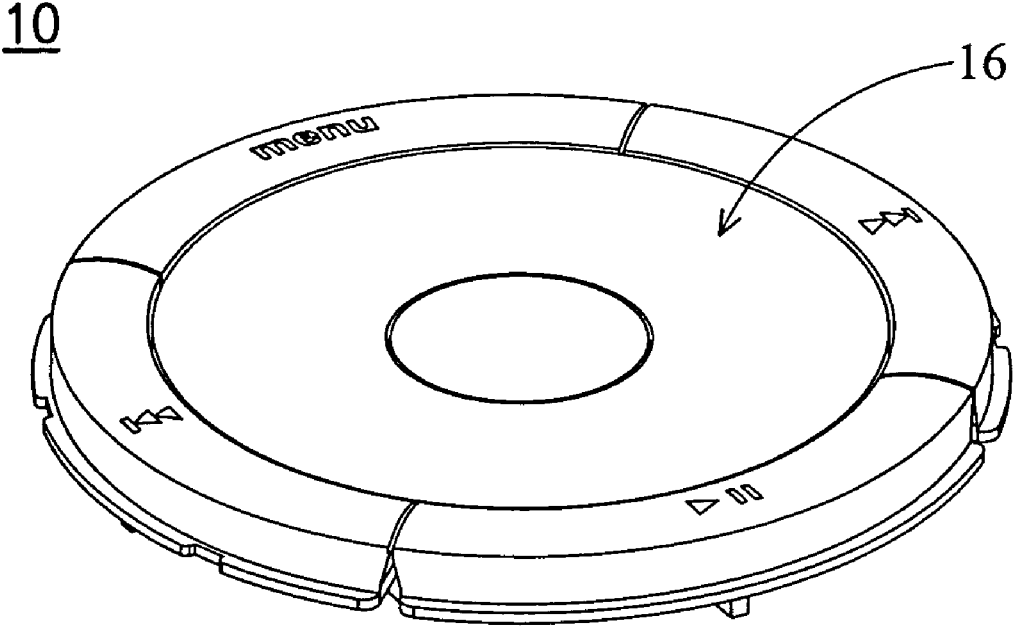
FIG. 2A is a perspective assembly view showing a conventional turntable structure.
Figure 2B:
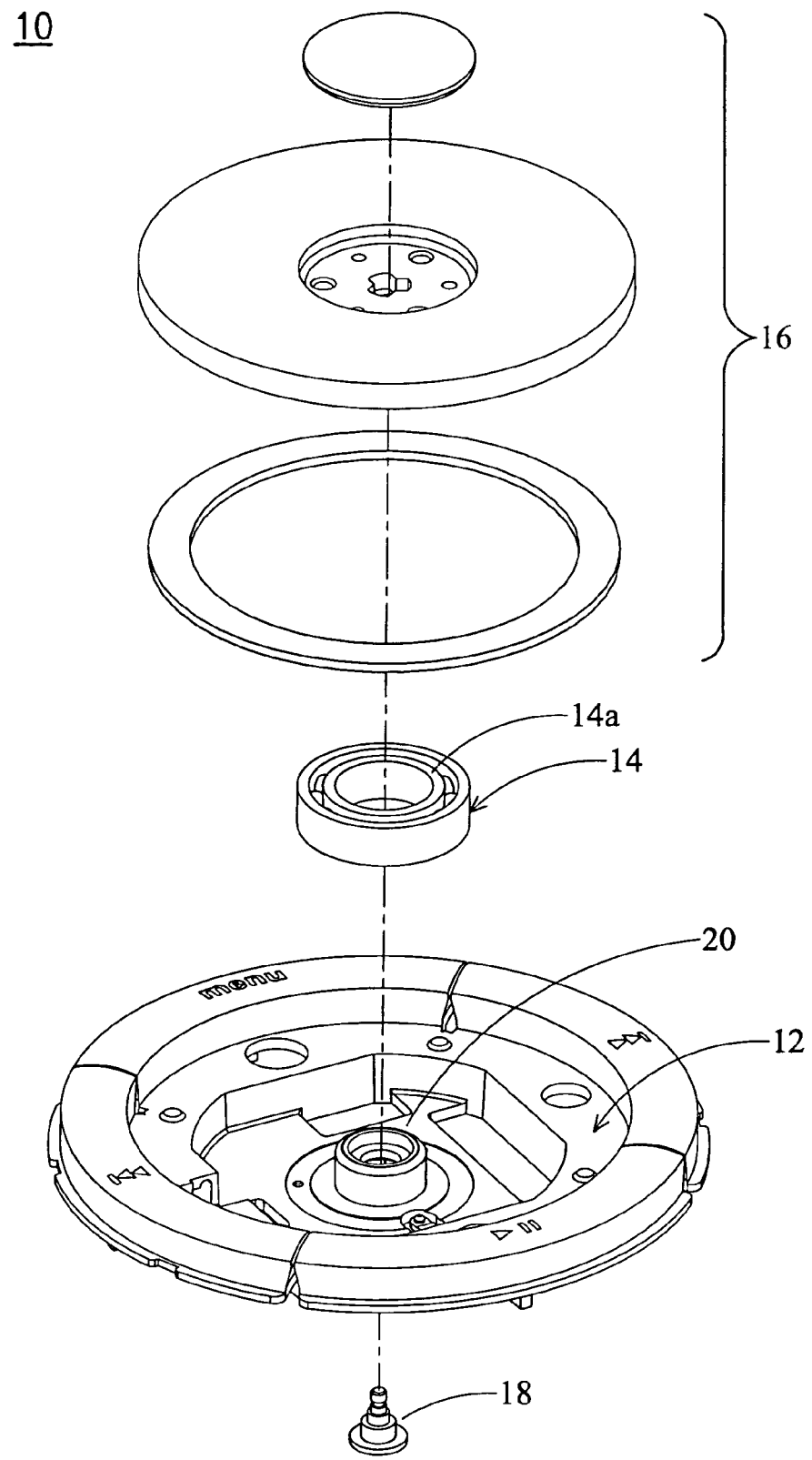
FIG. 2B is a perspective exploded view according to FIG. 2A.
Figure 3A:
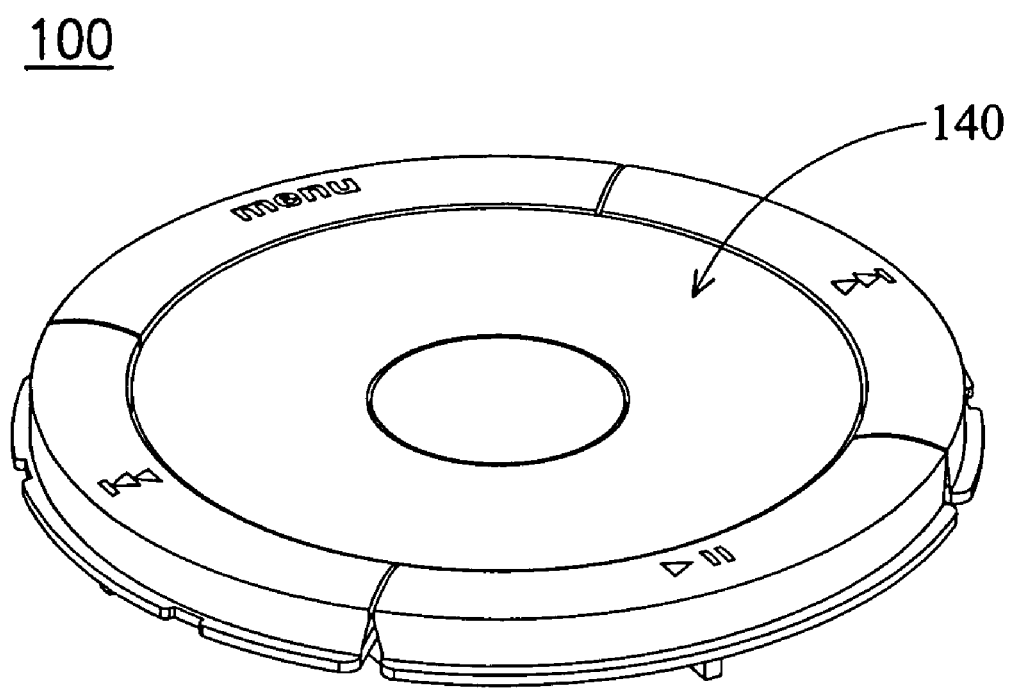
FIG. 3A is a perspective assembly view showing the turntable structure of the invention.
Figure 3B:
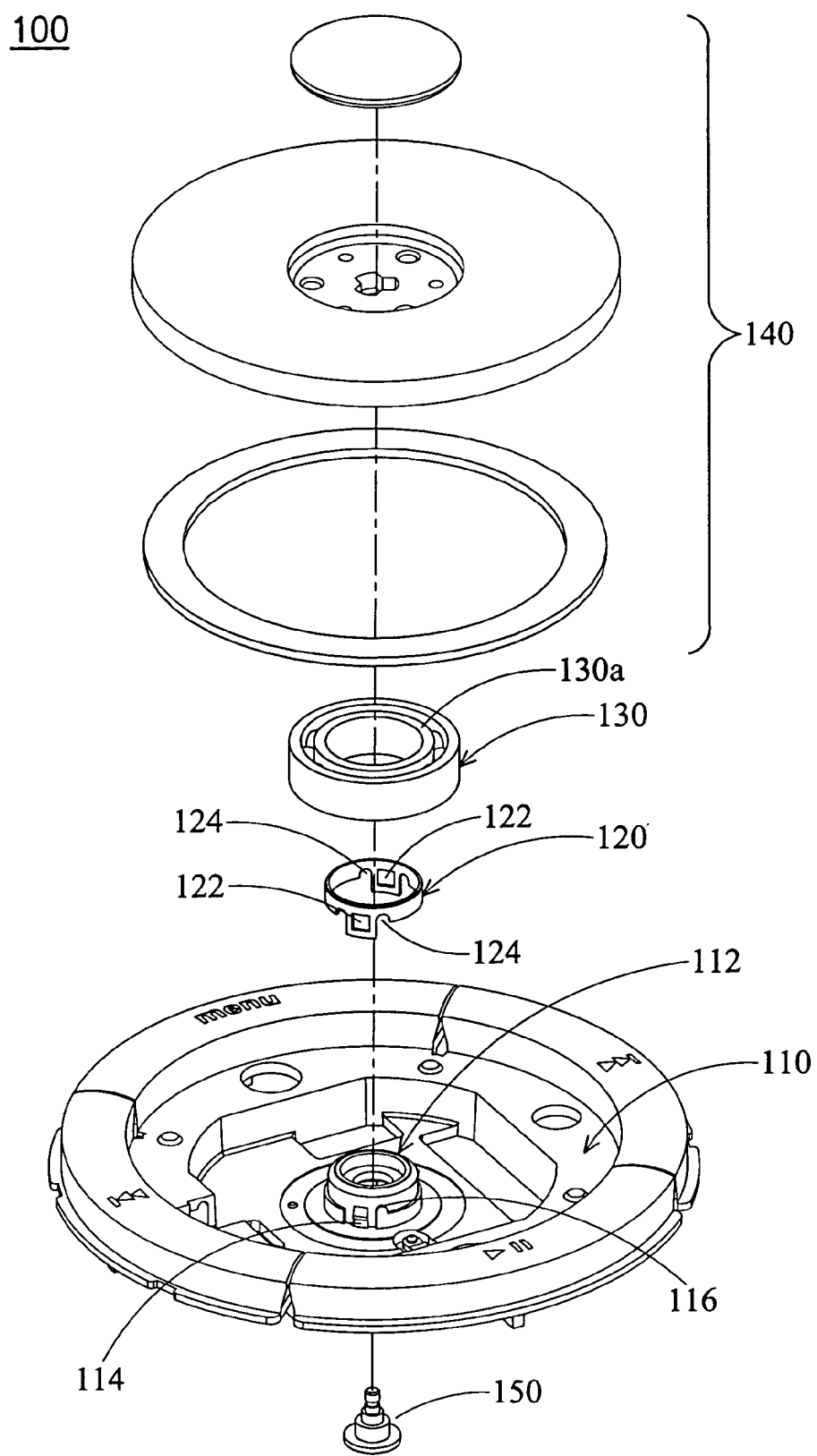
FIG. 3B is a perspective exploded view according to FIG. 3A.

Referring to FIG. 3A and FIG. 3B, the turntable structure 100 comprises a base 110, a metal retaining ring 120, a bearing assembly 130, a rotating assembly 140 and a rotating shaft 150.

The base 110 has a central post 112. A pair of protrusions 114 and a pair of positioning portions 116 are formed on opposite sides of the central post 112. In this embodiment, the central post 112 is hollow and formed integrally on the base 110.

The metal retaining ring 120 is disposed on the central post 112 and has two opposite engaging holes 122 and two opposite positioning grooves 124. When the metal retaining ring 120 is fit on the central post 112, the protrusions 114 of the central post 112 are engaged in the engaging holes 122 of the metal retaining ring 120 and the positioning portions 116 thereof are engaged with the positioning grooves 124 of the metal retaining ring 120. Meanwhile, a gap exists between the metal retaining ring 120 and the central post 112.

The bearing assembly 130 is assembled on the metal retaining ring 120. In this embodiment, the bearing assembly 130 is a ball bearing assembly. The rotating assembly 140 is assembled on the bearing assembly 130. The rotating shaft 150 is fit in the central post 112 and connected to the rotating assembly 140.

Moreover, the edge of the top end of the central post 112 is sloped. Thus, when the metal retaining ring 120 is fit on the central post 112, friction therebetween is reduced. Meanwhile, the portion between the central post 112 and the base 110 is a curved surface, thereby enhancing the strength thereof.

Accordingly, after the metal retaining ring 120 is fit on the central post 112 and the bearing assembly 130 is assembled on the retaining ring 120, a gap exists between the retaining ring 120 and the central post 112. Thus, when ambient temperature rises, the central post 112 and metal retaining ring 120 are not compressed or deformed due to thermal expansion. Meanwhile, the bearing assembly 130 exerts pressure on the metal retaining ring 120 but does not exert direct pressure on the central post 112. Thus, when the bearing assembly 130 expands due to thermal expansion, the inner ring 130*a* of the bearing assembly 130 exerts pressure on the metal retaining ring 120 rather than the central post 112. Accordingly, the turntable structure 100 is not adversely affected by thermal expansion and contraction, and the reliability thereof is significantly enhanced.

Specifically, the size of the metal retaining ring 120 should be small enough that when the metal retaining ring 120 contacts the central post 112 due to thermal expansion, the contact area between the metal retaining ring 120 and the central post 112 is minimal and undesirable effects caused thereby are limited. In addition, the smaller the metal retaining ring 120, the less the friction between the bearing assembly 130 and metal retaining ring 120.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A turntable structure to control function selection for a media player, comprising:
    a base having a central past, wherein the central post has a protrusion and a positioning portion formed thereon;
    a retaining ring disposed on the central post and having an engaging hole and a positioning groove, wherein the protrusion is engaged in the engaging hole, the positioning portion is engaged with the positioning groove, and a gap exists between the retaining ring and the central post to prevent deformation of the central post resulting from the thermal expansion and contraction;
    a bearing assembly encircling the retaining ring;
    a rotating assembly assembled on the bearing assembly; and
    a rotating shaft fit in the central post and connected to the rotating assembly.

2. The turntable structure as claimed in claim 1, wherein the retaining ring is metal.

3. The turntable structure as claimed in claim 1, wherein the central post is hollow.

4. The turntable structure as claimed in claim 1, wherein the edge of the top end of the central post is sloped.

5. The turntable structure as claimed in claim 1, wherein the portion between the central post and the base is a curved surface.

6. The turntable structure as claimed in claim 1, wherein the bearing assembly is a ball bearing assembly.

7. The turntable structure as claimed in claim 1, wherein the central post is formed integrally with the base.

8. The turntable structure as claimed in claim 1, wherein the bottom of the rotating assembly further comprises a plurality of toothed portions enabling the media player to detect the rotary position thereof.

9. A turntable structure, comprising:
    a base having a central post comprising a protrusion and a positioning portion formed thereon;
    a retaining ring disposed on the central post and comprising an engaging hole and a positioning groove wherein the protrusion is engaged in the engaging hole, the positioning portion is engaged with the positoning groove, and a gap exists between the retaining ring and the central post to prevent deformation of the central past resulting from thermal expansion and contraction;
    a bearing assembly encircling the retaining ring; and
    a rotating assembly assembled on the bearing assembly.

10. The turntable structure as claimed in claim 9, wherein the retaining ring is metal.

11. The turntable structure as claimed in claim 9, wherein the central post is hollow.

12. The turntable structure as claimed in claim 9, wherein the edge of the top end of the central post is sloped.

13. The turntable structure as claimed in claim 9, wherein the portion between the central post and the base is a curved surface.

14. The turntable structure as claimed in claim 9, wherein the bearing assembly is a ball bearing assembly.

15. The turntable structure as claimed in claim 9, wherein the central post is formed integrally with the base.

16. The turntable structure as claimed in claim 9, wherein the bottom of the rotating assembly further comprises a plurality of toothed portions enabling the media player to detect the rotary position thereof.

17. The turntable structure as claimed in claim 9, further comprising a rotating shaft fit in the central post and connected to the rotating assembly.

* * * * *